UNITED STATES PATENT OFFICE.

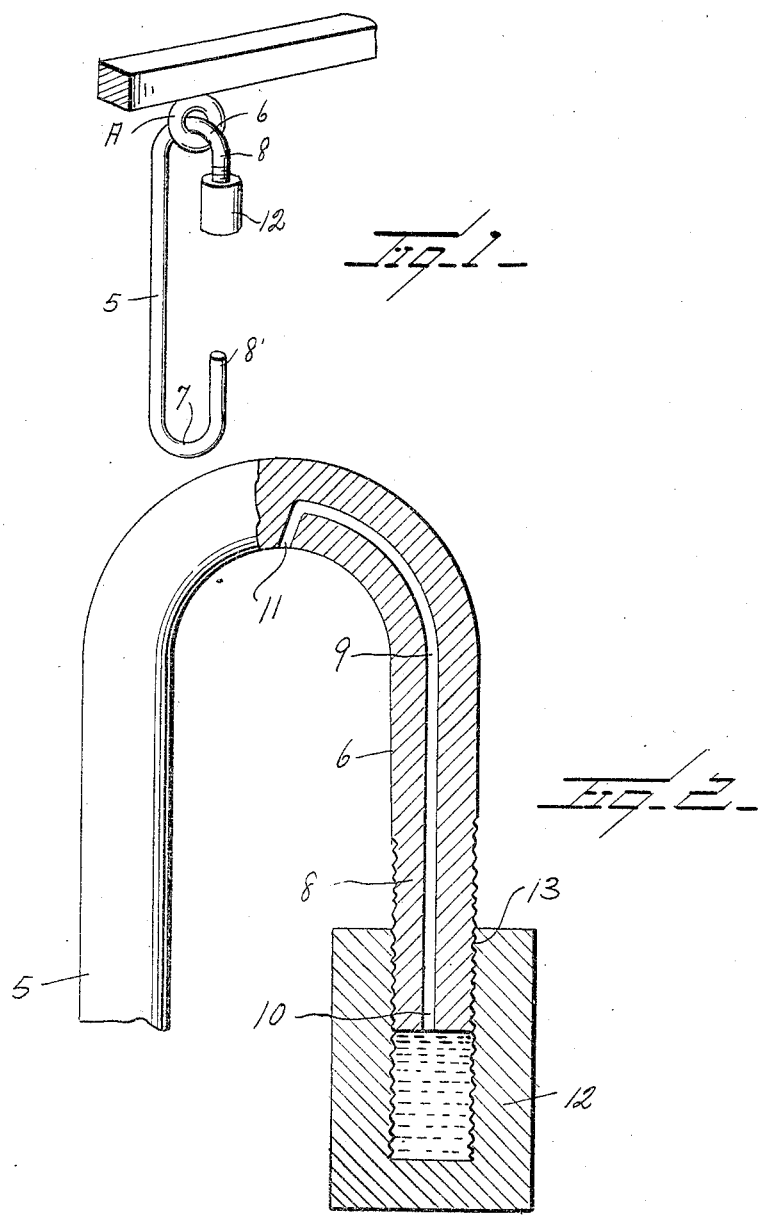

ROBERT EDWARD BOOTH, OF EAST TALLASSEE, ALABAMA.

SUPPORTING-LINK.

1,364,177. Specification of Letters Patent. Patented Jan. 4, 1921.

Application filed July 17, 1920. Serial No. 396,999.

*To all whom it may concern:*

Be it known that ROBERT E. BOOTH, a citizen of the United States, residing at East Tallassee, in the county of Tallapoosa and State of Alabama, has invented certain new and useful Improvements in Supporting-Links, of which the following is a specification, reference being had to the accompanying drawings.

This invention relates to links and particularly to a link for use in holding a swinging member to a support.

An object of the invention is to provide a link of this character which eliminates objectionable noises by lubricating means carried by the link.

Another object of the invention is to provide a link of this character having an oil channel in one end portion and a grease cup rotatable on said end portion to force grease through said channel.

Another object of the invention is to provide a link of this character wherein the grease cup carried by the end of the link also serves as retaining means to prevent accidental disengagement of the link from the eye or support.

A still further object of the invention is to provide a link of this character which is formed from a single length of material.

With these and other objects in view, the invention consists in the improved construction and arrangement of parts to be hereinafter more particularly described, fully claimed and illustrated in the accompanying drawings, in which:

Figure 1 is a perspective view of a link constructed in accordance with an embodiment of the invention, and Fig. 2 is an enlarged sectional view of one end of the link and the grease cup.

Referring to the drawings, 5 designates a length of material including end portions 6 and 7. Each end portion 6 and 7 is extended back upon the length 5 to provide hooks 8 and 8', the hooks being disposed in spaced parallel relation to the length 5 and in alinement with each other. By this means, one of the hooks may be engaged with the support while the other hook may be used to support a movable member.

It is well known that in swinging members such as hammocks, considerable weight is brought to bear on the connection of the hammock with its support. Friction is greatest where the end portion of the link engages the eye A carried by the support of the hammock and as a result, various noises are produced which in addition to being objectionable cause wear on the eye and the link, and render the swinging movement of the hammock difficult. To overcome this, I provide a channel 9 in the end portion 6, said channel being disposed in the intermediate portion of the end 6 and having its end 10 terminating at the extremity of the end 6 while its end 11 extends in angular relation to the main portion of the channel and penetrates the surface of the hook at the bight portion thereof.

To supply lubricant to the channel 9, a grease cup 12 is provided, said cup having an opening 13 in one end, to permit communication to the interior of the cup. The interior walls of the cup are threaded and adapted to engage the extremity of the hook 8 carried by the end portion 6, said extremity being threaded. It will be noted that the diameter of the grease cup is considerably greater than the diameter of the end of the hook. This permits a firm and convenient grip to be obtained on the oil cup to adjust the same, and also prevents the hook from passing through the eye A should the link be swung to such an extent as to cause the hook to be disposed in alinement with the opening in the eye A.

In use, the cup 12 is disengaged from the hook 8 of the end portion 6 so as to permit said hook to be passed through the eye A. The cup 12 is then supplied with grease and screwed on the hook 8. In the oscillating movement of the link, should noise be created by friction, the oil cup 12 is rotated by the operator, so as to compress the grease within the cup and force the same through the channel, on to the eye A thereby lubricating the hook and eliminating objectionable noises.

If desired, oil may be used instead of grease and in this case, when the link is moved in one direction, a portion of the oil is admitted to the channel in view of the inclined position of said hook when swung to one side. Upon the return movement of the link the lubricant previously admitted to the channel 9 is caused by gravity to travel toward and through the end 11 of the channel on to the eye A and hook 8. With the use of oil the cup 12 does not have to be rotated by the operator.

From the foregoing it will be readily seen that this invention provides a novel form of link which not only eliminates objectionable noises but prevents friction, and also permits the swinging member to which it is connected to operate with ease. Furthermore, it provides a safety attachment which prevents accidental disengagement of the link from its support should the link be swung to a dangerous angle. These advantages are possessed by a device that is simple in construction as it is formed from a small amount of material without requiring numerous parts and in view thereof will last indefinitely.

What is claimed is:—

A device of the character described comprising a stationary supporting eye, a movable link mounted on said eye, the end portions of said link extending toward and terminating in spaced relation to each other, one of said end portions having an unobstructed oil passage extending longitudinally thereof to the portion of the link engaged with the eye, and then directed substantially laterally of the link toward the bearing surface of said link, an oil cup adjustably threaded on said end of the link, whereby lubricant within the cup is forced by means of gravity, through the oil passage upon movement of the link on the eye.

In testimony whereof I hereunto affix my signature.

ROBERT EDWARD BOOTH.